Aug. 11, 1953   P. MAUBORGNE   2,648,505
LINE CONTROLLING DEVICE FOR USE WITH FISHING REELS
Filed April 12, 1948   3 Sheets-Sheet 1
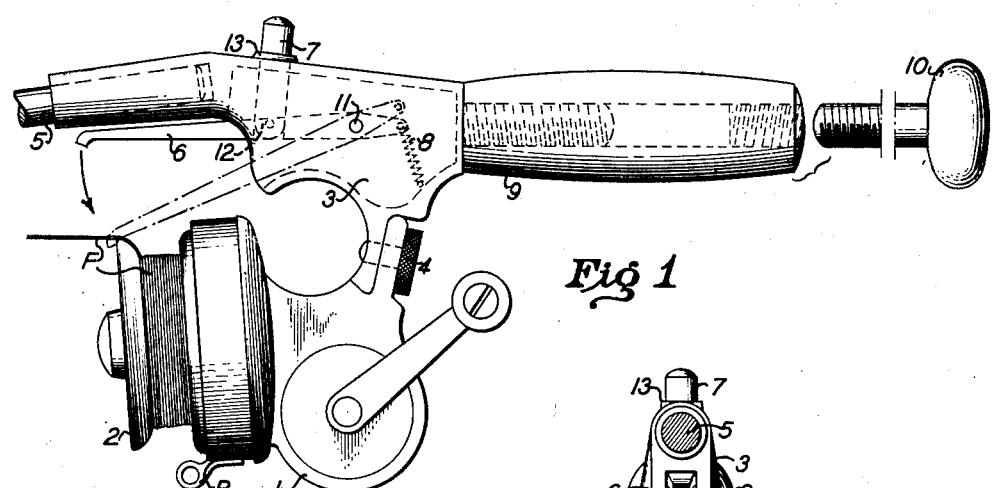
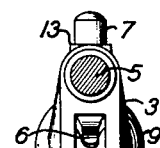
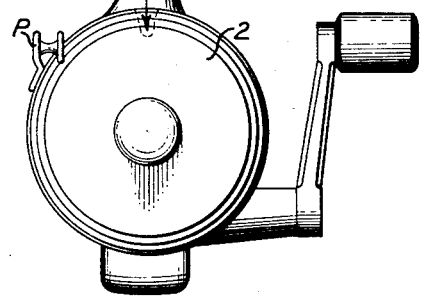
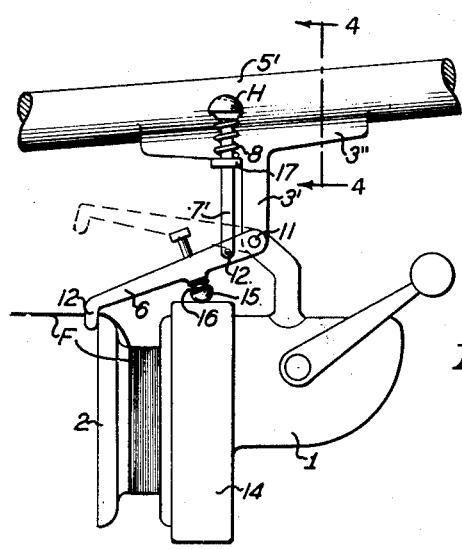
INVENTOR
PAUL MAUBORGNE
BY Hazeltine, Lake & Co.,
AGENTS

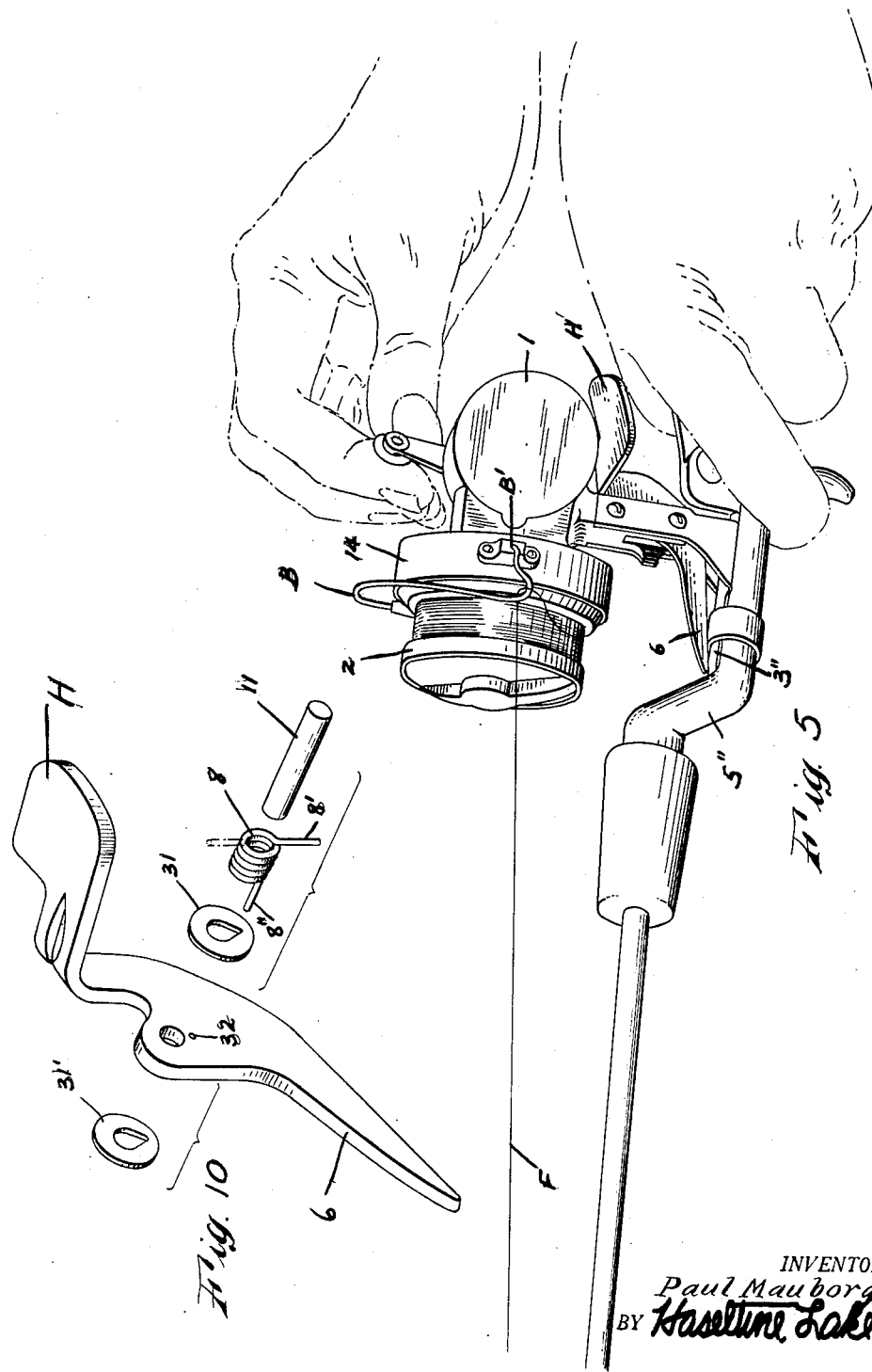

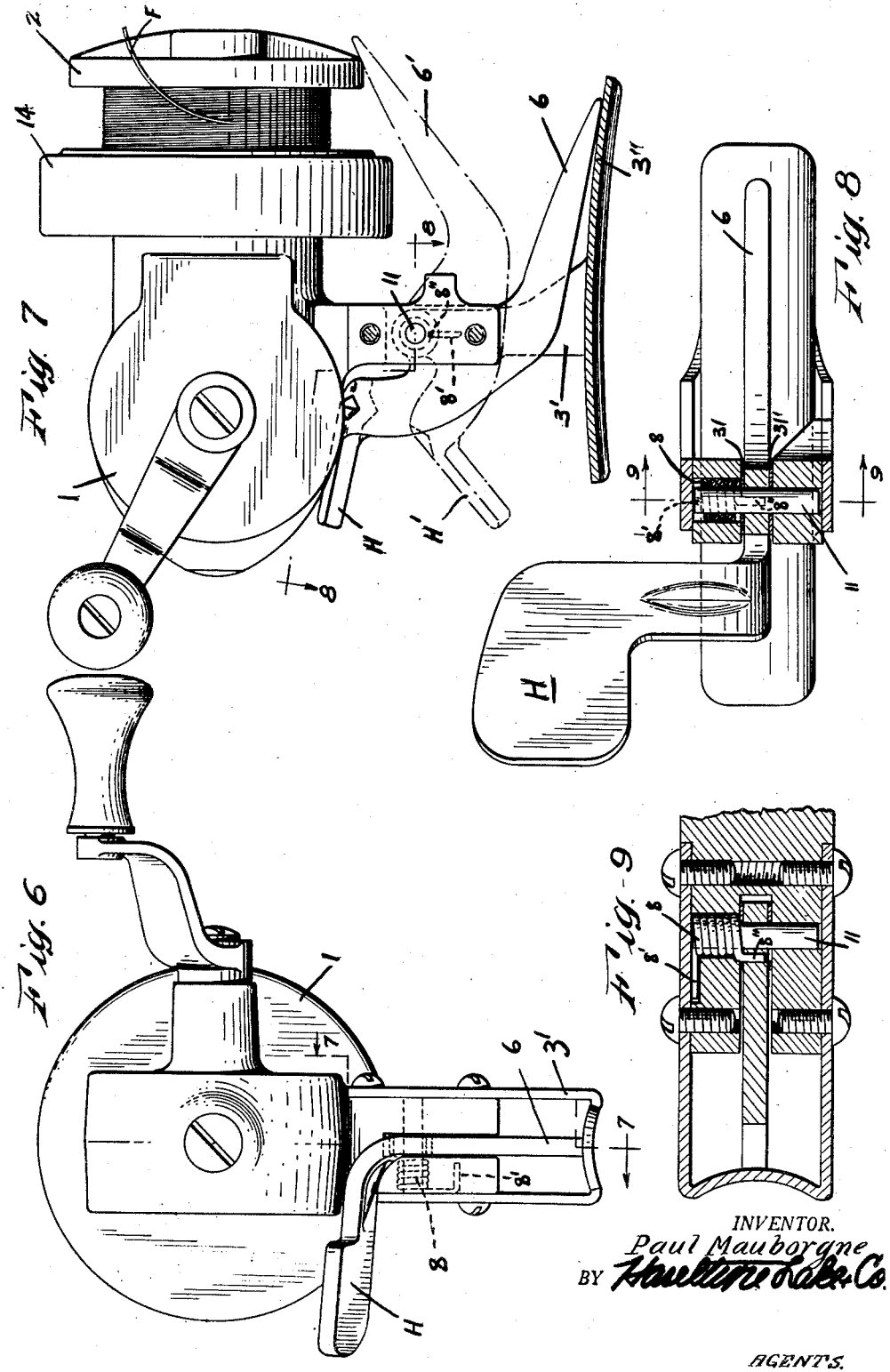

Patented Aug. 11, 1953

2,648,505

UNITED STATES PATENT OFFICE 2,648,505

LINE CONTROLLING DEVICE FOR USE WITH FISHING REELS

Paul Mauborgne, Niort, Deux Sevres, France

Application April 12, 1948, Serial No. 20,577
In France January 10, 1944

Section 1, Public Law 690, August 8, 1946
Patent expires January 10, 1964

6 Claims. (Cl. 242—84.5)

The present invention relates to improvements in line controlling devices for use with fishing reels, and this application is a continuation-in-part of my applications Ser. Nos. 585,034 and 682,097 filed respectively March 27, 1945, and July 8, 1946, now abandoned.

The fishing reels in common use are of two different types. In the one type, more particularly and extensively used in the U. S. A. (multiplying reel), the reel is of the revolving type, that is to say it is provided with a revolving spool, while in the other type which is used in Great Britain, and generally speaking in Europe (stripping reel), the reel is provided with a stationary nonrotary drum or spool.

With the first type which has been used in the States for a considerable number of years, unwinding of the line is directly controlled by thumb pressure of the angler's hand which holds the rod; the other fingers of said hand being placed below the reel, this being the standard position for the hand among American anglers.

The reels with non-revolving spools require a different hand-grip, the uncoiling of line being controlled by the angler's index or forefinger. They allow the use of lines of the gut type "nylon" single thread, not braided or twisted, which do not retain water and are consequently not subject to stiffening by cold weather nor to fill the guides with ice. It is most unadvisable to use these lines with revolving spool reels because if used backlash occurs continuously.

This invention is applicable more particularly to casting reels of the kind having a normally non-rotating line spool carried by a non-revolvable spindle generally arranged with its axis substantially parallel to the rod and having a line engaging flyer or pick-up rotatably mounted and arranged to carry the line round the stationary spool when the flyer is driven by the usual winding handle.

In cast fishing or spinning, especially when using this type of stationary or non-rotary spool, the angler controls the line when casting by means of the forefinger of the hand holding the rod, the forefinger releasing the line at the right moment.

An object of this invention is to provide a fishing reel in which the operation of the forefinger is replaced by the operation of a mechanical device, actuated by finger pressure but not necessarily by forefinger pressure.

Another object of this invention is to provide a fishing reel with which the fishing rod is not necessarily held in the direct vicinity of the reel, but which may be held conveniently rather to the rear of the reel.

A further object of this invention is to provide a fishing reel with which the relative position of said reel on the rod is to all intents and purposes independent of the position of the hand holding the rod.

Other objects will be in part obvious from the annexed drawings and in part hereinafter indicated in connection therewith by the following description of various embodiments of this invention.

The device according to the invention comprises briefly the combination of a stationary spool reel with a line controlling device actuated by finger pressure, preferably by thumb pressure, said line controlling device consisting essentially of a movable member adapted to be interposed, under the influence of finger pressure, on the path of the line and to be released by a return spring when the finger pressure is released.

In combination with such movable member and actuated by the same means, a braking member may be provided mounted with resilient means, adapted to brake the flyer under the finger pressure as well as when said finger pressure is partially released.

The invention thus allows reels with non-revolvable spools to be handled exactly in the same manner and with the same ease as revolving spool reels, without modifying the position of the angler's fingers, allowing therefore also the use of gut type (nylon) single thread making casting possible in freezing weather.

In the accompanying drawing:

Fig. 1 is an elevation of a first embodiment of the device according to the invention;

Fig. 2 is a front view thereof;

Fig. 3 is an assembly view of a modification of the device.

Fig. 4 is a cross section through the line 4—4 of Figure 3.

Fig. 5 is a general perspective view of a modification of the embodiments of Fig. 1 or 3 wherein the reel is located above the rod;

Fig. 6 is a rear view of the device of Fig. 5;

Fig. 7 is a view of Fig. 6 taken from the right with a portion cut away along line 7—7;

Fig. 8 is a view from above of a section of Fig. 7 along the line 8—8;

Fig. 9 is a section through Fig. 8 on the line 9—9; and

Fig. 10 is an exploded view of the component parts shown in the sectional views of Figs. 7 to 9.

Stationary spool fishing reels are generally fastened below the angling rod, the apparatus being provided with a pillar and rod plate to fasten them on the said rod by means of rings or any other convenient means.

The use of fishing reels with stationary spools of well known type compels the angler to fasten the reel below the rod so as to allow said angler to control the uncoiling of the line with the forefinger of his hand which holds the rod. Such a duty requires from the angler a sensibility of feeling which he does not possess when wearing gloves, and, besides, greatly limits the ease of casting in many positions.

In the embodiments shown in Figs. 1 to 4 the reel is arranged below the rod while in the embodiment of Figs. 5 to 10 it is arranged above the rod which may have an offset portion. Further, in the embodiment of Figs. 1 and 2 the reel and winder may be detachable for replacement or inter-change, and the line control device is connected to the rod-handle, while in the embodiments of Figs. 3 to 10 the line control device is connected to and removable with the reel and winder.

Referring now to Figs. 1 and 2, the rod with stationary reel or spool 2 of any desired type, carrying line F, is conveniently provided with a handle having a body 3. An attachment 4 may be provided for fixing the removable reel 2 and winder 1.

The body 3 is provided, in its front end, with a casing constituting a ferrule for receiving the rod 5 which may be of any appropriate type, and which is strongly secured in said ferrule in any convenient way not particularly shown.

The body 3 constitutes a casing receiving a line catch 6 pivoted on a pin 11 secured in said body 3. Said catch is provided with a button 7 pivoted on a pin 12 of the catch, and passing through an opening 13 of the body 3, the outer end of said button protruding above the body in a convenient position for allowing the same to be easily controlled by the thumb of the hand which holds the handle.

The catch 6 is provided with a return spring 8 located inside said body, and the length of the catch is such that in its position of use, it rests on the edge of the spool 2.

The body is provided, on its rear end, with the handle-grip 9 which is to be held in the angler's hand, and which receives the usual rear plate or rubber button 10.

The operation is as follows:

The parts of the device being in the positions shown in Fig. 1, the angler holding for instance in his right hand the unit consisting of handle, reel and rod in such a manner that his forefinger and middle finger are respectively before and behind the attachment 4, while his thumb is above the button 7, he depresses by means of his thumb the button 7 so as to bring the catch 6 in the position shown in dotted lines in Fig. 1, thus preventing any uncoiling of the line F previously disengaged from the flyer pick-up P and line winder.

When the angler casts the bait, he releases the button 7, the catch 6 comes back to the position shown in full lines, due to the action of the spring 8, and releases the line F, the bait being thus cast without any danger that the line become entangled or suffers any kind of backlash.

In the constructional form in Figures 3 and 4, the reel of conventional form comprises a bobbin 2, containing the line F, which for its re-winding is subjected to the action of a pick-up or bail of conventional construction and not shown, driven by a fly-wheel 14, the action being motivated by a handle 4. The complete reel is connected by a support 3' to an arm 3" fixed in any suitable manner to the fishing rod 5'.

On a pivot 11 rendered solid with the support 3' is articulated an arresting lever 6 similar to that of Figs. 1 and 2 comprising a tongue 12 which is applied in the position shown in full lines on the periphery of the bobbin 2 in order to arrest the unwinding of the line F. This arresting lever 6 is provided with a manipulating push button arrangement 7' with return spring 8 supported on a bracket 17, the location being preferably such that the head H of the push button is within reach of the thumb of the operator's hand, holding the rod 5'.

On the arresting lever 6 may be mounted a slipper 15 which is constantly pressed in downward direction by the spring 16.

Due to this arrangement, when the fisherman wants to cast his line, he first of all presses with his thumb on the head H of the push button to bring it into the position shown in full lines in Figure 3; the tongue 12 of the arresting lever 6 arrests the unwinding of the line F whilst, on the other hand, the spring slipper 15 compressing the spring 16 acts on the flywheel 14 which it immobilises. The next step is to disengage the line from the pick-up or to put the pick up or bail into inoperative position.

The rod being in a suitable position for casting, the fisherman releases the head H of the push button 7' which rises slightly just sufficient for the tongue 12 to free the line F which then unwinds. The slipper 15 has, however, remained in contact with the flywheel 14 which is thus immobilized during the running out of the line. When the cast is completed, the thumb disengages completely to head H, and the arresting lever 6 arrives at the position shown by the dot-and-dash line in Figure 3 so that the slipper completely frees the flywheel 14.

In the constructional form shown in Figs. 5 to 10, wherein the reel is located above the rod, the catch member 6 and push button H can be made of a single piece pivoted on a pin 11 and actuated by the angler's thumb in the same manner as described for the other forms. Pin 11 serves conveniently as a support for spring 8, one end 8' of which extends radially to be applied against a portion of support 3' while the other end 8" is inserted in a hole 32 of catch 6. Washers 31 and 31" having elongated holes for the passage of end 8" may be inserted to stabilize catch 6, support 3' being shown in this form as substantially V-shaped.

In use, the form of Figures 5 to 10 operates as follows:

When the angler has wound in the line F onto reel 2 by actuating the winder to rotate fly-wheel 14 and therewith pick-up or bail B, he disengages the bail by rotating it in support B' and grasps the rod-handle in the right hand, he depresses button H to position H' until catch 6 meets the spool 2 in the position 6' shown in broken line in Fig. 7, and he casts the bait, judiciously releasing his thumb from button H. The line may be stopped at any time by re-exerting pressure on button H, and this without any backlash whatsoever.

It is of course obvious that the catch 6 of Figures 5 to 10 may be used in either of the embodiments of Figs. 1 and 2 or 3 and 4 by placing the reel above the rod. In other words either the catch may be pivoted at its inner end and provided with an actuating button pivoted thereto or acting thereon at a point intermediate its ends, as shown in Figs. 1 to 4, or it may be pivoted at a point intermediate its ends and provided with a fixed actuating member or surface at its inner end, as shown in Figs. 5 to 10, according to whether the outer end is required to be lowered to meet a reel mounted below the rod or raised to meet a reel mounted above the rod.

What I claim is:

1. In a stripping reel having a spool, a reel support for fixedly attaching the reel to a rod with the spool axis extending substantially in the direction of the rod, means normally holding the spool against rotation, a line-winder rotatable about the spool, and means for rotating the line-winder: a finger-pressure actuated line-controlling device comprising a lever pivoted on the reel support transversely thereof between the reel and the rod and having a portion thereof formed to be swingable in a plane parallel to the plane containing the axis of the spool and the general direction of the line into a position where the distal end thereof is interposed in the path of the line where it strips from the spool, an actuating member connected to the lever for wholly manual displacement of said swingable portion of the lever into said position, and a spring acting on said lever in opposition to manual displacement for automatic displacement of said swingable portion from said position.

2. The stripping reel claimed in claim 1 wherein the support includes a pair of cheeks between which said lever is pivoted, said spring being positioned between said cheeks.

3. The combination as set forth in claim 2, wherein said lever is pivoted to said cheeks at a point intermediate the ends thereof, and wherein one extremity of said lever extends forwardly from said cheeks a distance substantially equal to the furthest point from said cheeks at which the forward edge of the reel is situated, the other, rearward extremity of said lever being enlarged to accommodate the angler's finger.

4. A stripping reel as in claim 1, wherein said lever is pivoted intermediate the ends thereof on the reel support and having one end extending therefrom to contact the forward lip of the spool, the other end of the lever extending to form said actuating means.

5. A stripping reel as in claim 1 wherein said lever is pivoted at one end thereof on the reel support, the other end thereof extending to contact the forward lip of the spool, and wherein the finger actuating means includes a link pivoted to the lever intermediate the ends thereof.

6. The stripping reel claimed in claim 1 wherein said portion extends to contact the forward lip of the spool.

PAUL MAUBORGNE.

References Cited in the file of this patent

UNITED STATES PATENTS

| Number | Name | Date |
| --- | --- | --- |
| 1,150,575 | Blodgett | Aug. 17, 1915 |
| 1,187,840 | Illingworth | June 20, 1916 |
| 2,120,190 | Rickards et al. | June 7, 1938 |
| 2,179,413 | Kolosso | Nov. 7, 1939 |
| 2,225,719 | Shotton | Dec. 24, 1940 |
| 2,229,470 | Pezon | Jan. 21, 1941 |
| 2,299,156 | Lind | Oct. 20, 1942 |

FOREIGN PATENTS

| Number | Country | Date |
| --- | --- | --- |
| 418,837 | Great Britain | Nov. 1, 1934 |
| 795,144 | France | Mar. 4, 1936 |
| 904,699 | France | Mar. 12, 1945 |